(12) United States Patent
Lubischer et al.

(10) Patent No.: US 11,597,424 B2
(45) Date of Patent: *Mar. 7, 2023

(54) RETRACTABLE STEERING COLUMN SYSTEM

(71) Applicant: STEERING SOLUTIONS IP HOLDING CORPORATION, Saginaw, MI (US)

(72) Inventors: Frank P. Lubischer, Commerce Township, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,910

(22) Filed: Apr. 23, 2019

(65) Prior Publication Data
US 2019/0248403 A1    Aug. 15, 2019

Related U.S. Application Data

(63) Continuation of application No. 14/989,153, filed on Jan. 6, 2016, now Pat. No. 10,343,706.

(Continued)

(51) Int. Cl.
*B62D 1/183* (2006.01)
*B62D 1/19* (2006.01)
*B62D 1/28* (2006.01)

(52) U.S. Cl.
CPC ............... *B62D 1/183* (2013.01); *B62D 1/19* (2013.01); *B62D 1/28* (2013.01)

(58) Field of Classification Search
CPC .......... B62D 1/28; B62D 1/283; B62D 1/286; B62D 15/025
See application file for complete search history.

(56) References Cited

U.S. PATENT DOCUMENTS 6,070,686 A * 6/2000 Pollmann ............ B60R 25/0221
180/287
6,360,149 B1 * 3/2002 Kwon .................... B60K 35/00
701/41

(Continued)

FOREIGN PATENT DOCUMENTS

CN    106314524 A    1/2017
JP    2010269793 A    12/2010

OTHER PUBLICATIONS

First Office Action regarding corresponding CN App. No. 201910461933.3; dated Jun. 3, 2021.

*Primary Examiner* — Barry Gooden, Jr.
(74) *Attorney, Agent, or Firm* — Dickinson Wright PLLC

(57) ABSTRACT

A control system for a steering wheel includes a steering wheel switchable between a rotational condition and a non-rotational condition. The control system also includes a steering gear operatively coupled to a plurality of road wheels of a vehicle, the steering wheel and the steering gear electrically coupled to each other. The control system further includes a controller in operative communication with the steering wheel and the steering gear, the controller configured to control the steering gear independent of the steering wheel when the vehicle is in an autonomous vehicle driving condition, the steering wheel being in a retracted position during the autonomous vehicle driving condition.

2 Claims, 3 Drawing Sheets

Related U.S. Application Data

(60) Provisional application No. 62/174,114, filed on Jun. 11, 2015.

(56) References Cited

U.S. PATENT DOCUMENTS

| | | | | |
|---|---|---|---|---|
| 8,994,521 B2* | 3/2015 | Gazit | | B62D 1/28 |
| | | | | 340/425.5 |
| 9,199,553 B2* | 12/2015 | Cuddihy | | B60N 2/005 |
| 9,333,983 B2* | 5/2016 | Lathrop | | B62D 1/04 |
| 10,065,655 B2* | 9/2018 | Bendewald | | B60W 50/08 |
| 2003/0094330 A1* | 5/2003 | Boloorchi | | B62D 5/008 |
| | | | | 180/446 |
| 2003/0146037 A1* | 8/2003 | Menjak | | B62D 5/006 |
| | | | | 180/402 |
| 2004/0099468 A1* | 5/2004 | Chernoff | | B60T 7/085 |
| | | | | 180/409 |
| 2005/0242562 A1* | 11/2005 | Ridgway | | B62D 1/195 |
| | | | | 280/777 |
| 2005/0263996 A1* | 12/2005 | Manwaring | | B62D 1/195 |
| | | | | 280/775 |
| 2009/0276111 A1* | 11/2009 | Wang | | B60T 8/17551 |
| | | | | 701/23 |
| 2013/0002416 A1* | 1/2013 | Gazit | | B62D 1/28 |
| | | | | 340/438 |
| 2013/0133463 A1* | 5/2013 | Moriyama | | B62D 1/184 |
| | | | | 74/493 |
| 2013/0205933 A1* | 8/2013 | Moriyama | | B62D 1/187 |
| | | | | 74/493 |
| 2014/0277896 A1* | 9/2014 | Lathrop | | B62D 1/04 |
| | | | | 701/23 |
| 2015/0088357 A1* | 3/2015 | Yopp | | G05D 1/0061 |
| | | | | 701/23 |
| 2016/0244086 A1* | 8/2016 | Moriyama | | B62D 1/184 |
| 2016/0347348 A1* | 12/2016 | Lubischer | | B62D 1/181 |
| 2016/0362126 A1 | 12/2016 | Lubischer et al. | | |
| 2016/0368522 A1* | 12/2016 | Lubischer | | B62D 1/181 |
| 2016/0375860 A1* | 12/2016 | Lubischer | | B60R 21/203 |
| | | | | 74/493 |
| 2016/0375925 A1* | 12/2016 | Lubischer | | B62D 6/00 |
| | | | | 701/41 |
| 2016/0375926 A1* | 12/2016 | Lubischer | | B62D 1/183 |
| | | | | 74/493 |
| 2016/0375927 A1* | 12/2016 | Schulz | | B62D 1/183 |
| | | | | 280/775 |
| 2016/0375928 A1* | 12/2016 | Magnus | | F16H 25/2204 |
| | | | | 74/493 |
| 2017/0029018 A1* | 2/2017 | Lubischer | | B62D 6/008 |
| 2017/0113712 A1* | 4/2017 | Watz | | B60Q 1/1469 |
| 2017/0294120 A1* | 10/2017 | Ootsuji | | B60K 28/066 |
| 2017/0297606 A1* | 10/2017 | Kim | | B62D 1/181 |
| 2018/0154932 A1* | 6/2018 | Rakouth | | B62D 5/091 |

* cited by examiner

RETRACTABLE STEERING COLUMN SYSTEM

CROSS-REFERENCE TO RELATED APPLICATIONS

This patent application claims priority to U.S. patent application Ser. No. 14/989,153, filed Jan. 6, 2016, which claims priority to U.S. Provisional Patent Application Ser. No. 62/174,114, filed Jun. 11, 2015, both of which are incorporated herein by reference in their entireties.

FIELD OF THE INVENTION

The following description relates to steering column assemblies and, more specifically, to a retractable steering column assembly.

BACKGROUND

Vehicle steering wheels are typically used to steer a vehicle. When a vehicle is equipped with an autonomous driving assist system ("ADAS"), the steering wheel does not need to rotate as the self-driving system turns the road wheels. This non-rotation allows the steering column and wheel to have another use or purpose.

Accordingly, it is desirable to provide a steering column assembly that enables the driver to manipulate the position or purpose of the steering wheel.

SUMMARY OF THE INVENTION

In one exemplary embodiment of the present disclosure, a control system for a steering wheel includes a steering wheel switchable between a rotational condition and a non-rotational condition. The control system also includes a steering gear operatively coupled to a plurality of road wheels of a vehicle, the steering wheel and the steering gear electrically coupled to each other. The control system further includes a controller in operative communication with the steering wheel and the steering gear, the controller configured to control the steering gear independent of the steering wheel when the vehicle is in an autonomous vehicle driving condition, the steering wheel being in a retracted position during the autonomous vehicle driving condition.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A detailed description of one or more embodiments of the disclosed system and method are presented herein by way of exemplification and not limitation with reference to the Figures.

Figure 1:
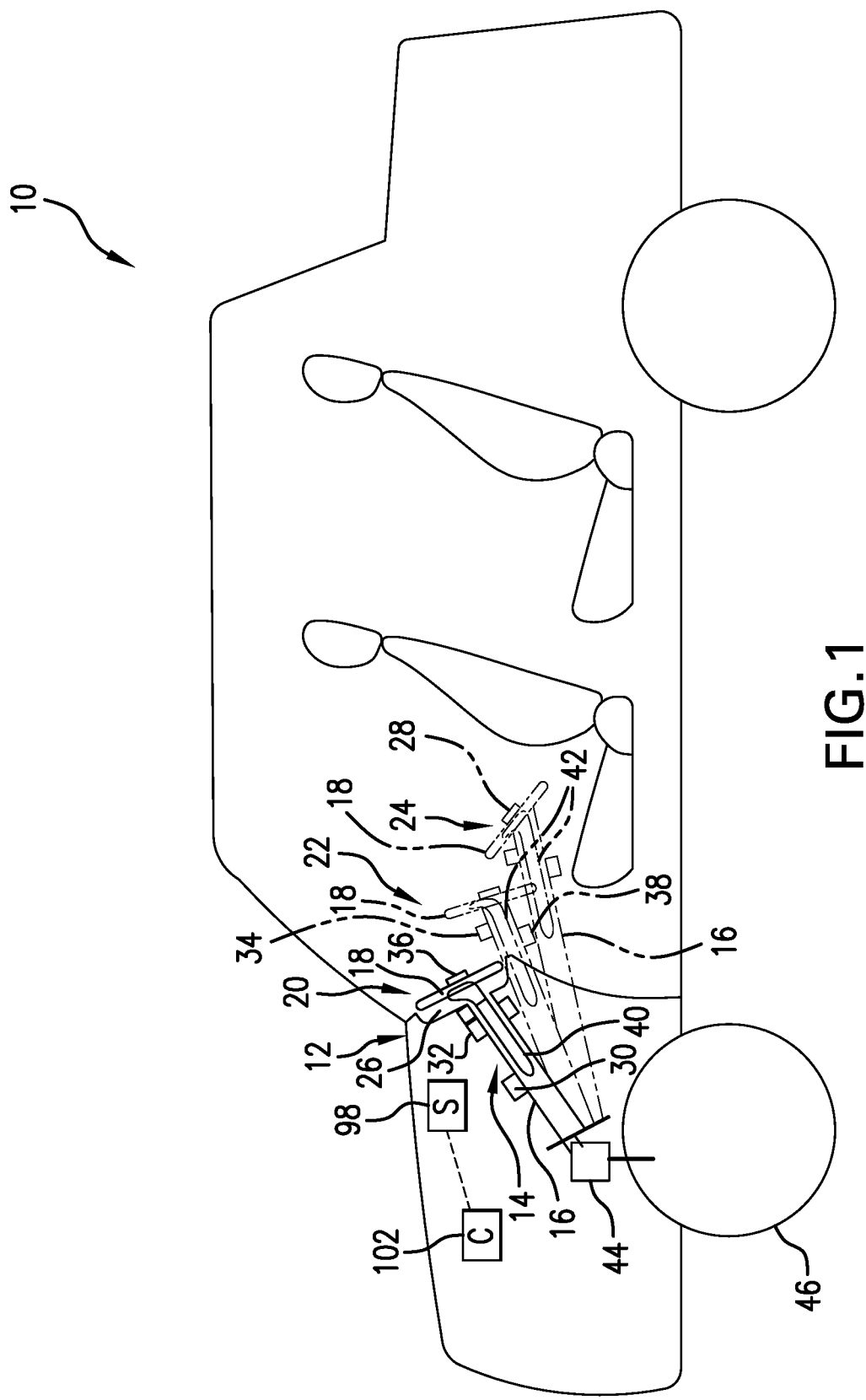
FIG. 1 is a schematic view of a vehicle and steering column assembly according to one embodiment of the disclosure; and, FIGS. 2A and 2B show a flowchart demonstrating an operation of the vehicle and steering column assembly according to one embodiment of the disclosure.

Referring now to the Figures, where embodiments will be described, without limiting same, FIG. 1 schematically illustrates an embodiment of a vehicle 10, such as an autonomous driving assisted steering ("ADAS") equipped vehicle, generally having an instrument panel 12 and a retractable steering column assembly 14. Steering column assembly 14 generally includes a steering column shaft 16 and a steering input device, such as steering wheel 18, coupled thereto.

In the illustrated embodiment, steering column assembly 14 is movable between a retracted position 20, a deployed or driving position 22, and an accessory or utility position 24. In the retracted position 20, portions of assembly 14 such as steering wheel 18 are disposed away from the driver toward or into instrument panel 12, which provides increased space for the driver. In the illustrated embodiment, instrument panel 12 includes one or more receiving compartments or areas 26 to receive some or all of steering column assembly 14. For example, receiving area 26 may be configured to receive steering wheel 18 such that wheel 18 and thus assembly 14 may be stowed within and flush with instrument panel 12. In such an embodiment, the steering column assembly 14 is stowable, however the distance in which the assembly 14 is retracted can be varied. The displacement of the steering column shaft 16 and wheel 18 in retracted position 20 creates additional cabin space for the driver's comfort and convenience to perform non-driving activities including, but not limited to, reading, working, entertaining, eating, texting, etc.

In the driving position 22, steering wheel 18 may be used by a driver to steer the vehicle. In the accessory position 24, portions of assembly 14 such as steering wheel 18 may be used for non-driving activities such as reading, working, or other forms of entertainment. As such, at least a portion of steering wheel 18 is configured to be non-rotatable such that objects like computers or books may be rested thereupon. Further, at least a portion of the steering wheel 18 may be pivoted with respect to the steering column shaft 16 (reducing an angle between the steering column shaft 16 and the portion of the steering wheel 18) to form a work area. For example, a tray table or work surface 28 may be coupled to or integrated with steering wheel 18 to enable such activities. Alternatively, only a rim or hub of the steering wheel is non-rotatable and includes attachments such as hooks to support work surface 28. In other embodiments, an electronic device or the like is integrated into the stationary wheel 18 or work surface 28. The steering wheel 18 may also be moved to bring the work surface 28 closer to the driver as needed in the accessory position 24.

In one embodiment, steering column assembly 14 further includes a steering column adjustment assembly 30, a decoupling assembly 32, a torque interface assembly 34, and one or more sensors 36. Adjustment assembly 30 is configured to move steering column assembly 14 for driver comfort (e.g., telescope or rake adjustment) and to move assembly 14 between the retracted position 20 and the driving position 22. Adjustment assembly 30 may include one or more mechanical/electrical mechanisms such as a motor. Adjustment assembly 30 may also include a retraction mechanism that enables a driver to mechanically, electronically, or manually return steering wheel 18 from the retracted position 20 to the driving position 22.

In the driving position 22, a steering gear 44 links rotation of the steering wheel 18 to turning of the road wheels 46. The steering gear 44 may be mechanically connected to the steering column shaft 16, or alternatively may be electrically connected to the steering column shaft 16, such as in a "steer by wire" system. In one embodiment, decoupling assembly 32 is configured to selectively decouple one or more portions of assembly 14 (e.g., shaft 16) from the vehicle steering gear 44 such that steering wheel 18 is in a non-rotatable mode, removing the ability of the steering wheel 18 to control a direction of road wheels 46 through the steering gear 44. This decoupling assembly 32 may be mechanically or electrically activatable by a clutch, or by steer-by-wire, or counter-rotated by a servo-actuator, for example. Alternatively or additionally, assembly 32 may provide a counter rotation to wheel 18 to counteract any rotation of wheel 18 caused by the autonomous driver assisted steering system such that wheel 18 functions and appears as non-rotatable. The decoupling assembly 32 need not be located along the shaft 16, and may be positioned elsewhere for decoupling the shaft 16 either mechanically and/or electrically from the steering gear 44.

Further, the decoupling assembly 32 allows the steering column shaft 16 and wheel 18 to be displaced forward in the vehicle 10 to the retracted position 20 because the steering wheel 18 is no longer being used by the driver to guide the vehicle 10. The retracting action may accomplished by, for example, long stroke, electrical actuators responding to the driver's intention through a switch and motor controller, or by the driver manually releasing a clamp and pushing the steering wheel 18 and steering column shaft 16 forward to the retracted position 20. In any case, the embodiments described herein make retraction of the steering column shaft 16 and wheel 18 away from the driver possible in order to provide space for non-driving related activities such as working, reading, and game playing.

In the exemplary embodiment, torque interface assembly 34 is configured to detect and monitor driver torque input (rotational and translational) to steering wheel 18, for example, to determine if the driver is in control of the vehicle. Sensors 36 are configured to detect and monitor driver compartment conditions, the driver's condition, the vehicle environment, and/or the vehicle control systems. For example, sensors 36 may: detect objects between the retracted steering wheel and the driver that may cause an unsafe situation for the driver to safely retake control of the vehicle; detect if the driver is not in a position to safely retake control of the vehicle; and/or detect undesirable vehicle dynamics that require the driver to retake control of the vehicle. Whether in the retracted position 20, the deployed/driving position 22, or the accessory/utility position 24, the fore-aft position of the steering column shaft 16 and wheel 18 is known by the ADAS system 98 by one or both of the torque interface assembly 34 and the sensors 36, which may be positioned on the steering column shaft 16 or wheel 18. Sensors may include, but are not limited to switches and potentiometers.

The retracting or stowing process of moving the steering column shaft 16 and wheel 18 from the driving position 22 (or accessory/utility position 24) to the retracted position 20 must eventually be reversed to return steering control of the vehicle 10 to the driver. That is, the driver should be able to reach forward, grip the wheel 18, and be able to relatively quickly bring the wheel 18 to the driving position 22 to resume steering of the vehicle 10. To resume steering of the vehicle 10, the steering shaft 16 is mechanically and/or electrically reconnected to the steering gear 44. Such reconnection may be accomplished by the decoupling assembly 32, such that the decoupling assembly 32 is effectively a steering wheel coupler/de-coupler. When returned to the driving position 22, the steering column 16 and steering wheel 18 are fixed, at least temporarily, such as by the decoupling assembly 32 and/or a deactivatable, reversible lock 38, in that fore-aft position of the driving position 20. When fixed in the driving position 20, the vehicle 10 provides the ability to reduce the driver's kinetic energy, such as may result from a crash, via an energy absorbing mechanism 40 in the steering column shaft 16, the deformation of the steering wheel 18, and the deployment of the driver's air bag 42. In the deployed condition of the air bag 42, the air bag 42 is also capable of absorbing energy.

Figure 2A:
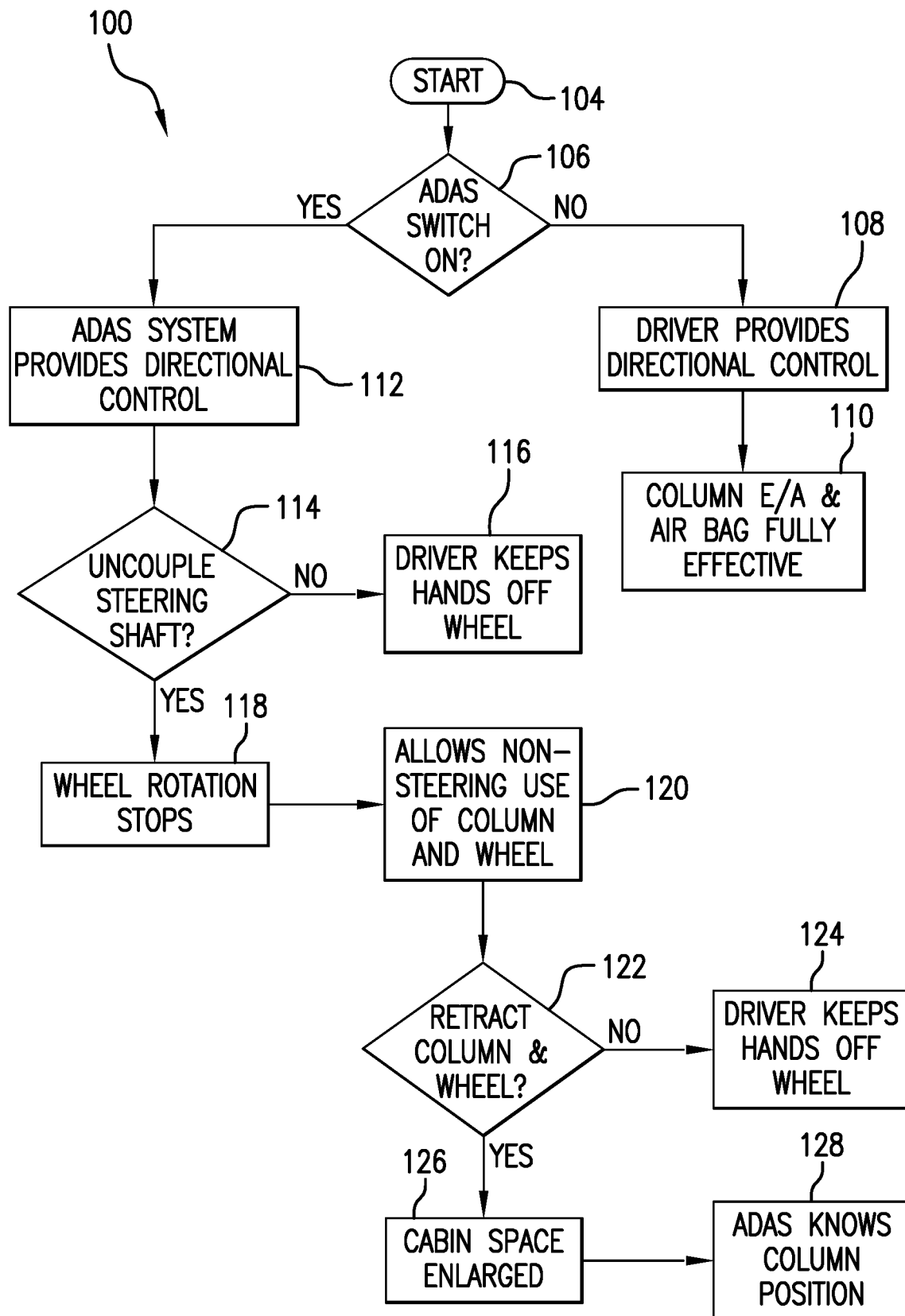
Figure 2B:
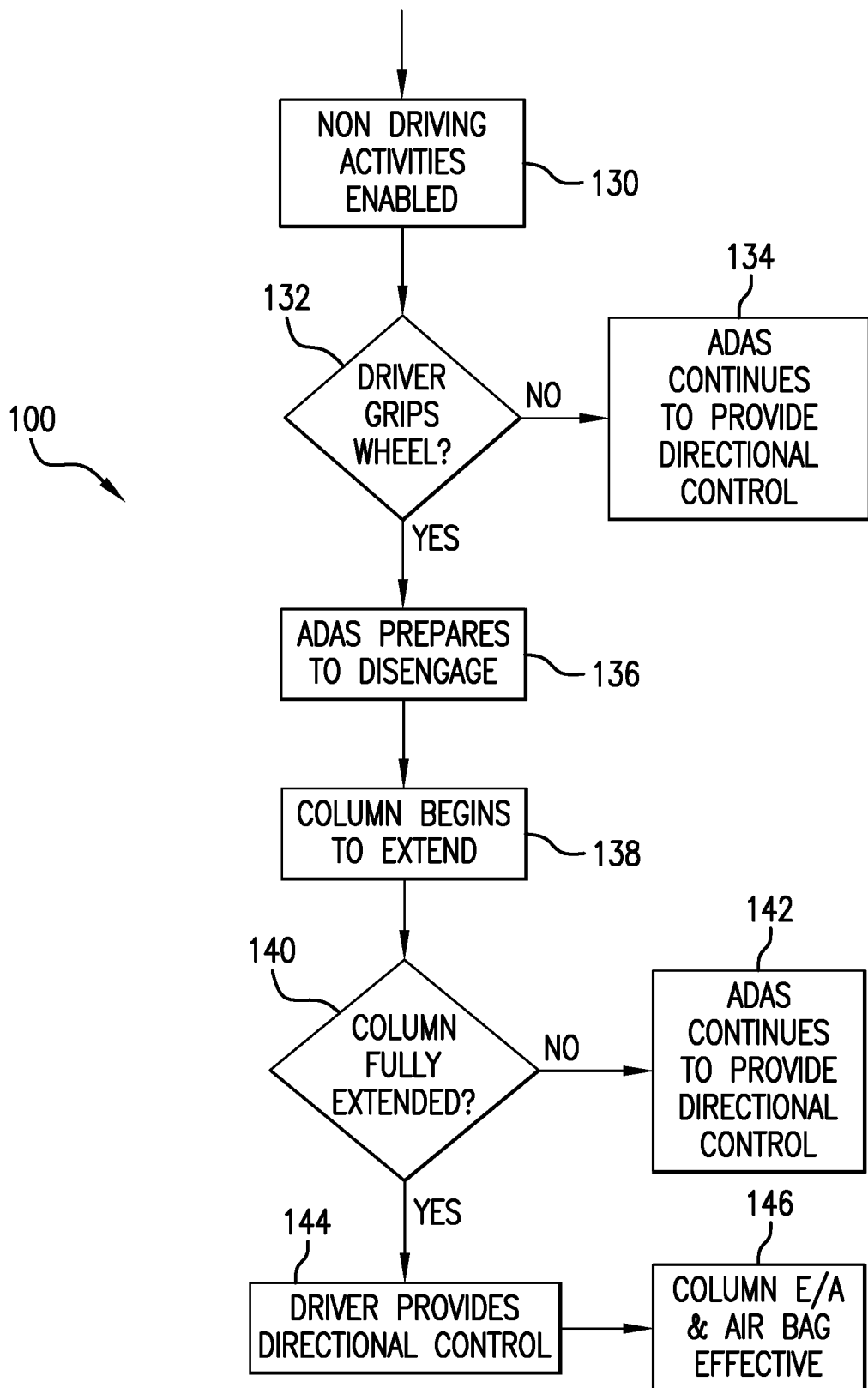

With reference now to FIGS. 2A and 2B, an embodiment of an operation 100 of the vehicle 10 is shown. Starting with FIG. 2A, a start 104 of the operation may be assessed by a controller 102 of an ADAS system, shown diagrammatically at 98 in FIG. 1. The controller 102 may receive information (signal) from, but not limited to, one or more of the steering column adjustment assembly 30, decoupling assembly 32, torque interface assembly 34, sensors 36, reversible lock 38, as well as any other feature within the vehicle 10 that is communicable with the controller 102. The operation 100 will determine, as demonstrated by block 106, whether an ADAS switch of the ADAS system 98 is on, such as by driver input to initiate the ADAS mode. When the ADAS switch is not on, then, as demonstrated by block 108, a driver provides directional control. As demonstrated by block 110, the energy absorbing mechanism 40 and air bag 42 are rendered operational (the air bag 42 is ready to deploy if required).

When the ADAS switch is on, then, as demonstrated by block 112, the ADAS system 98 provides directional control. The controller 102 further determines, as demonstrated by block 114, if the steering shaft 16 has been decoupled yet, such as by decoupling assembly 32. If not, then as demonstrated by block 116, the driver keeps hands off the steering wheel 18 in order to continue with ADAS control (otherwise, ADAS switch will be switched off due to driver input through steering wheel 18, the steering shaft 16 will remain coupled to steering gear 44, and the driver will provide control). If the steering shaft 16 is decoupled, then as demonstrated by block 118, rotation of wheel 18 is stopped. As demonstrated by block 120, the rotationally-fixed steering wheel 18 allows non-steering use of the column shaft 16 and wheel 18.

At some point during the operation 100, a driver may wish to retract the steering wheel 18. The controller 102 will determine, such as via receipt of a signal from steering column adjustment assembly 30 or any sensors 36 relating to position, as demonstrated by block 122, if the column shaft 16 and wheel 18 are fully retracted during the retracting operation to position 20. If not, then as demonstrated by block 124, the driver will keep hands off the steering wheel 18. However, if the steering column shaft 16 and wheel 18 are retracted in the retracted position 20, then as demonstrated by block 126, cabin space within the vehicle 10 is enlarged and, as demonstrated by block 128, the ADAS system 98 is aware of the position of the column 16, such as via controller 102 and at least one sensor communicable with the controller 102.

With reference now to FIG. 2B, (a continuance of the operation 100 shown in FIG. 2A), non-driving activities are enabled, as demonstrated by block 130, due to the cabin space enlargement (block 126 of FIG. 2A). During the operation 100, the controller 102 will further determine, as demonstrated by block 132, whether or not the driver has gripped the wheel 18. If the driver does not grip the wheel 18, then as demonstrated by block 134, the ADAS system 98 will continue to provide directional control. However, if the driver has gripped the wheel 18, then as demonstrated by block 136, the ADAS system 98 prepares to disengage. As demonstrated by block 138, the column shaft 16 begins to extend. Extension of the column shaft 16 may be done via the driver and/or by automatic extension as a response to driver input. The controller 102 will determine, as demonstrated by block 140, whether or not the column shaft 16 is fully extended. If the column shaft 16 is not fully extended to the driving position 22, then the ADAS system 98 will continue to provide directional control to the vehicle 10, as demonstrated by block 142. However, if the column shaft 16 is fully extended, then, as demonstrated by block 144, the driver provides direction control via the steering wheel 18, and the column energy absorbing mechanism 40 and air bag 42 are rendered operational (with the air bag 42 ready to deploy if required), as demonstrated by block 146. Complete extension of the column shaft 16 may be determined by the controller 102, for example, by actuation of the lock 38 or information from the decoupling assembly 32 or steering column adjustment assembly 30.

Thus, operation 100 ensures that the column energy absorbing mechanism 40 and air bag 42 are operational and activatable, if needed, when the column shaft 16 is extended to the driving position 22 and the driver is providing directional control 108 of the vehicle 10.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a steering system comprising:
a steering column shaft;
a steering wheel operatively coupled to the steering column shaft and switchable between a rotational condition and a non-rotational condition, wherein the entire steering wheel is pivotable with respect to the entire steering column shaft;
a steering gear operatively coupled to a plurality of road wheels of a vehicle, the steering wheel and the steering gear electrically coupled to each other; and
an autonomous driving assist system (ADAS) having an ADAS switch that is switchable between an ON condition and an OFF condition, the ADAS configured to provide steering directional control when the vehicle is in an autonomous vehicle driving condition and the ADAS switch is in the ON condition, the steering wheel being in a retracted position during the autonomous vehicle driving condition, the ADAS switch moving to the OFF condition upon manual movement of the steering wheel away from the retracted position to allow manual steering directional control, wherein the retracted position is defined by the entire steering wheel being at least partially disposed within an instrument panel.

2. The control system of claim 1, wherein the retracted position is defined by the steering wheel being recessed in a flush position with the instrument panel.

* * * * *